United States Patent
Sterne et al.

(10) Patent No.: US 10,284,371 B2
(45) Date of Patent: *May 7, 2019

(54) BRUTE FORCE ATTACK PREVENTION SYSTEM

(71) Applicant: Workday, Inc., Pleasanton, CA (US)

(72) Inventors: Brandon Sterne, Danville, CA (US); Austin Munsch, Livermore, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,020

(22) Filed: Sep. 5, 2017

(65) Prior Publication Data

US 2018/0109384 A1 Apr. 19, 2018

Related U.S. Application Data

(63) Continuation of application No. 14/716,488, filed on May 19, 2015, now Pat. No. 9,787,696.

(51) Int. Cl.
*H04L 9/32* (2006.01)
*H04L 29/06* (2006.01)
*H04L 9/06* (2006.01)

(52) U.S. Cl.
CPC .......... *H04L 9/3213* (2013.01); *H04L 9/0643* (2013.01); *H04L 9/3236* (2013.01); *H04L 9/3271* (2013.01); *H04L 63/08* (2013.01); *H04L 63/0807* (2013.01); *H04L 63/1441* (2013.01); *H04L 9/3226* (2013.01); *H04L 63/10* (2013.01)

(58) Field of Classification Search
CPC . H04L 9/3213; H04L 9/3236; H04L 63/0807; H04L 63/1441; H04L 9/3271; H04L 9/0643; H04L 63/10; H04L 9/3226
See application file for complete search history.

(56) References Cited

U.S. PATENT DOCUMENTS

| | | | |
|---|---|---|---|
| 7,353,388 B1 | 4/2008 | Gilman | |
| 7,606,915 B1 * | 10/2009 | Calinov | G06F 21/36 709/229 |
| 7,694,335 B1 | 4/2010 | Turner | |
| 8,046,832 B2 * | 10/2011 | Goodman | H04L 51/12 709/206 |

(Continued)

OTHER PUBLICATIONS

Rob Shapland, "Techniques for preventing a brute force login attack", Dec. 2, 2012, retrieved online from <https://web.archive.org/web/20121202012358/https://www.computerweekly.com/answer/Techniques-for-preventing-a-brute-force-login-attack>, retrieved on May 7, 2018. (Year: 2012).*

(Continued)

*Primary Examiner* — Farid Homayounmehr
*Assistant Examiner* — Zhimei Zhu
(74) *Attorney, Agent, or Firm* — Van Pelt, Yi & James LLP

(57) ABSTRACT

A system for preventing a brute force attack includes an output interface, an input interface, and a processor. An output interface is to provide a workfactor, a challenge token, and a login page to a client. An input interface is to receive a response token, a username, and a password. A processor is to determine whether the response token satisfies a condition based at least in part on the workfactor and determine whether the username and password are valid in the event that it is determined that the response token satisfies the condition based at least in part on the workfactor.

14 Claims, 7 Drawing Sheets

(56) References Cited

U.S. PATENT DOCUMENTS

| | | |
|---|---|---|
| 8,312,540 B1 | 11/2012 | Kahn |
| 8,471,677 B2 | 6/2013 | Fitzgibbon |
| 8,863,244 B2 * | 10/2014 | Bono .................. H04L 12/585 |
| | | 713/152 |
| 8,904,506 B1 | 12/2014 | Canavor |
| 9,348,981 B1 * | 5/2016 | Hearn .................. H04L 9/3271 |
| 9,705,895 B1 * | 7/2017 | Gutzmann ............. H04L 63/14 |
| 9,807,092 B1 * | 10/2017 | Gutzmann .......... H04L 63/1458 |
| 2006/0005013 A1 | 1/2006 | Huitema et al. |
| 2006/0020559 A1 | 1/2006 | Steinmetz |
| 2006/0037064 A1 | 2/2006 | Jeffries |
| 2006/0053298 A1 | 3/2006 | Ingerman |
| 2006/0069804 A1 | 3/2006 | Miyake |
| 2007/0005985 A1 | 1/2007 | Eldar |
| 2009/0282253 A1 | 11/2009 | Rose |
| 2010/0031315 A1 | 2/2010 | Feng |
| 2011/0214169 A1 | 9/2011 | Pinkas |
| 2014/0204411 A1 | 7/2014 | Riedel |
| 2014/0250538 A1 | 9/2014 | Rapaport |
| 2014/0259157 A1 | 9/2014 | Toma |
| 2014/0380418 A1 | 12/2014 | Wang |
| 2015/0096020 A1 * | 4/2015 | Adams ................ H04L 63/1458 |
| | | 726/23 |
| 2015/0356555 A1 | 12/2015 | Pennanen |
| 2016/0057169 A1 | 2/2016 | Honda |

OTHER PUBLICATIONS

Fred B. Schneider, lecture notes entitled "Something You Know, Have, or Are", 2007, retrieved online from <http://web.archive.org/web/20070913202309/http://www.cs.cornell.edu/Courses/cs513/2005fa/N N Lauth People. html >, retrieved on Jul. 20, 2016.

Pinkas et al. "Securing passwords against dictionary attacks." Proceedings of the 9th ACM conference on Computer and communications security. CCS 2002. Nov. 18-22, 2002. ACM Press pp. 161-170.

R Kirushnaamoni. "Defenses to curb online password guessing attacks." Information Communication and Embedded Systems (ICICES), 2013 International Conference on. IEEE, 2013. pp. 317-322.

* cited by examiner

BRUTE FORCE ATTACK PREVENTION SYSTEM

CROSS REFERENCE TO OTHER APPLICATIONS

This application is a continuation of co-pending U.S. patent application Ser. No. 14/716,488, entitled BRUTE FORCE ATTACK PREVENTION SYSTEM filed May 19, 2015 which is incorporated herein by reference for all purposes.

BACKGROUND OF THE INVENTION

An Internet connected business server typically has a login process for verifying the identity of a user attempting to connect to the server (e.g., utilizing a username and password). An attacker attempting to break into the business server can make a brute force attack on the login process by submitting different passwords for a username known to be valid, until the correct password is submitted and the attacker is granted access. One known brute force attack prevention system is the CAPTCHA (e.g., completely automated public Turing test to tell computers and humans apart), wherein a user is required to enter the text shown in an image presented in a login screen. The text shown in the image is purposefully distorted to make it difficult to identify for a computer executing a brute force attack. However, as computer power grows, the time needed for a computer to identify a CAPTCHA shrinks, making it less of a barrier to a brute force attack. Use of a CAPTCHA is additionally unpopular with users. Another known brute force attack prevention system is the use of a lockout after a certain number of incorrect password attempts. After a predetermined number of incorrect password attempts associated with a username (e.g., within a given period of time), no more password attempts are accepted. Password attempts are accepted again after a lockout delay (e.g., 5 minutes, 24 hours, etc.) or after a manual reset (e.g., the user calls customer service). A lockout does not stop an attacker because the attacker can make password attempts for successive usernames until being locked out of each username. Using this method, an attacker can lock out a large fraction of the server users, effectively shutting the server down by preventing a large number of users from logging in.

BRIEF DESCRIPTION OF THE DRAWINGS

Various embodiments of the invention are disclosed in the following detailed description and the accompanying drawings.

DETAILED DESCRIPTION

Figure 1:
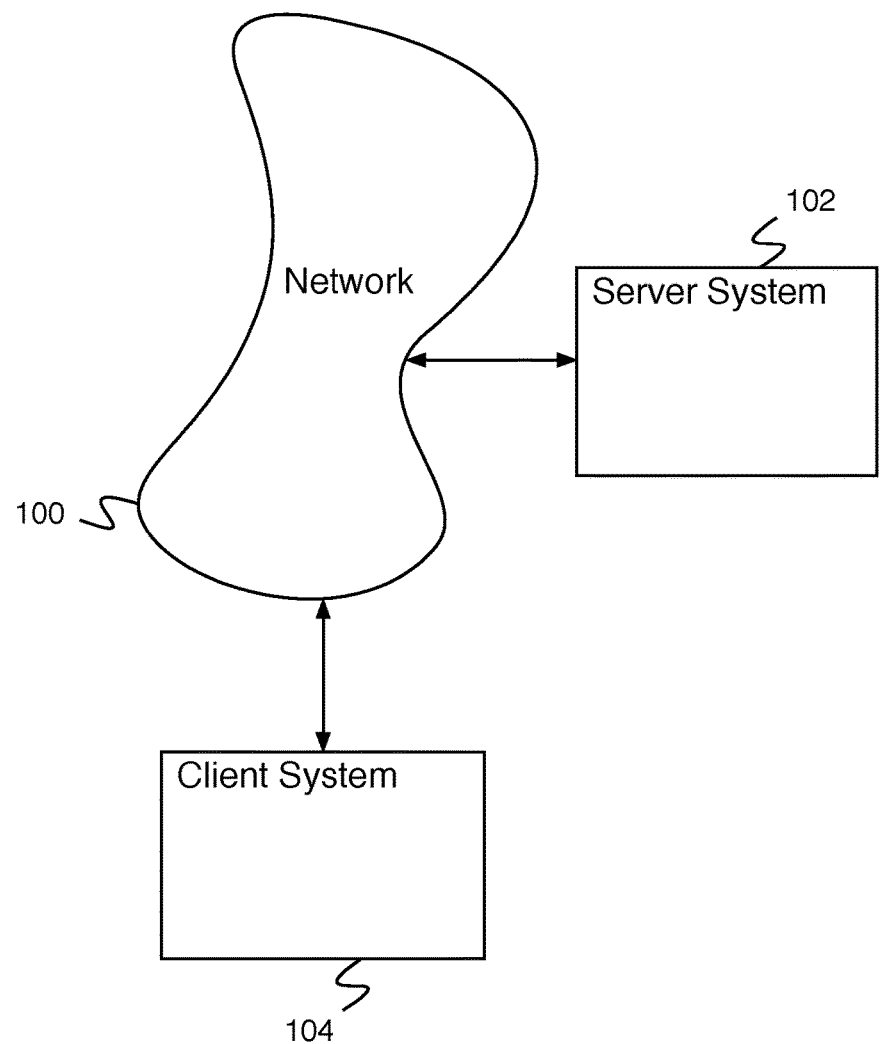
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for preventing a brute force attack comprises an output interface, an input interface, and a processor. The output interface is to provide a workfactor, a challenge token, and a login page to a client. The input interface is to receive a response token, a username, and a password. The processor is to determine whether the response token satisfies a condition based at least in part on the workfactor. The processor is further to determine whether the username and password are valid in the event the response token satisfies the condition based at least in part on the workfactor.

In some embodiments, a system for preventing a brute force attack receives a request for a login page from a client and provides the client with the login page, including username and password entry fields. When the client enters a username into the username field on the login page, the username is provided to the system for preventing a brute force attack. The system for preventing a brute force attack then determines a challenge token and a workfactor based at least in part on the username. The system for preventing a brute force attack provides the challenge token and workfactor to the client. The challenge token and workfactor comprise a challenge that the client must satisfactorily respond to in order for the system for preventing a brute force attack to even consider a login attempt. The client system determines a response token responding to the challenge token and workfactor, and provides the response token along with a password associated with the username to the system. The system for preventing a brute force attack determines whether the response token satisfies a condition, and in the event the response token satisfies the condition, the system for preventing a brute force attack determines whether the username and password are valid. In the event the response token does not satisfy the condition, the system for preventing a brute force attack does not determine whether the username and password are valid (e.g., the login attempt is ignored). In the event the system for preventing a brute force attack determines that the username and password are valid, access is granted. In the event the system for preventing a brute force attack determines that the username and password are not valid, access is not granted, and a stored number of failed login attempts associated with the username is incremented. In some embodiments, when a workfactor is determined, it is based at least in part on the stored number of failed login attempts associated with the username.

In some embodiments, the condition comprises a condition based on a hash function. In some embodiments, the condition requires the hash of the concatenation of the response token determined by the client and the challenge token provided to the client to have greater than a threshold number of leading zero bits. In some embodiments, the hash comprises a SHA-256 hash. The hash function is a one-way function (e.g., a system can determine the hash of a number, but it can never determine a number from its hash), thus there is no way to directly determine the response token necessary to meet the condition based on the challenge token. The client system must iteratively determine a test response token, concatenate the test response token with the challenge token, hash the concatenated value, and determine whether the hash meets the condition. The threshold number of leading zero bits is determined based at least in part on the workfactor. In some embodiments, the workfactor comprises the threshold number of leading zero bits (e.g., a workfactor of 1 indicates the hashed value must have 1 leading zero bit, a workfactor of 10 indicates the hashed value must have 10 leading zero bits, etc.). Increasing the workfactor therefore decreases the likelihood that the hashed value will meet the condition, and increases the expected number of test response tokens that need to be attempted before a response token is found that satisfies the condition. In some embodiments, the condition comprises a different condition. In various embodiments, the condition comprises a condition on the trailing zero bytes of a hashed concatenation of tokens, a condition on the divisibility of a hashed concatenation of tokens, a number factorization challenge (e.g., the challenge token comprises a large number with two prime factors, and the correct response token comprises the two prime factors), or any other appropriate condition.

FIG. 1 is a block diagram illustrating an embodiment of a network system. In some embodiments, the network system of FIG. 1 comprises a system for a database server system. In some embodiments, the network system of FIG. 1 comprises a system for preventing a brute force attack. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network.

Server system 102 and client system 104 communicate via network 100. In some embodiments, server system 102 comprises a database server system. In various embodiments, server system 102 comprises a human resources system database server, a financial database server, a document management server, an applications server, a machine control server, a website server, or any other appropriate server. In some embodiments, server system 102 comprises a system for preventing a brute force attack. Client system 104 comprises a client system attempting to utilize the capabilities of server system 102. In various embodiments, the network system comprises 1, 2, 5, 10, 22, 122, or any other appropriate number of client systems. In some embodiments, client system 104 comprises a client system attempting to log in to server system 102. In some embodiments, client system 104 comprises a system operated by a legitimate user of server system 102 (e.g., a user with permission to user server system 102). In some embodiments, client system 104 comprises a system operated by an attacker attempting to gain illegitimate access to server system 102. In some embodiments, client system 104 comprises a system or a system of a set of systems attempting a brute force attack on server system 102.

Figure 2:
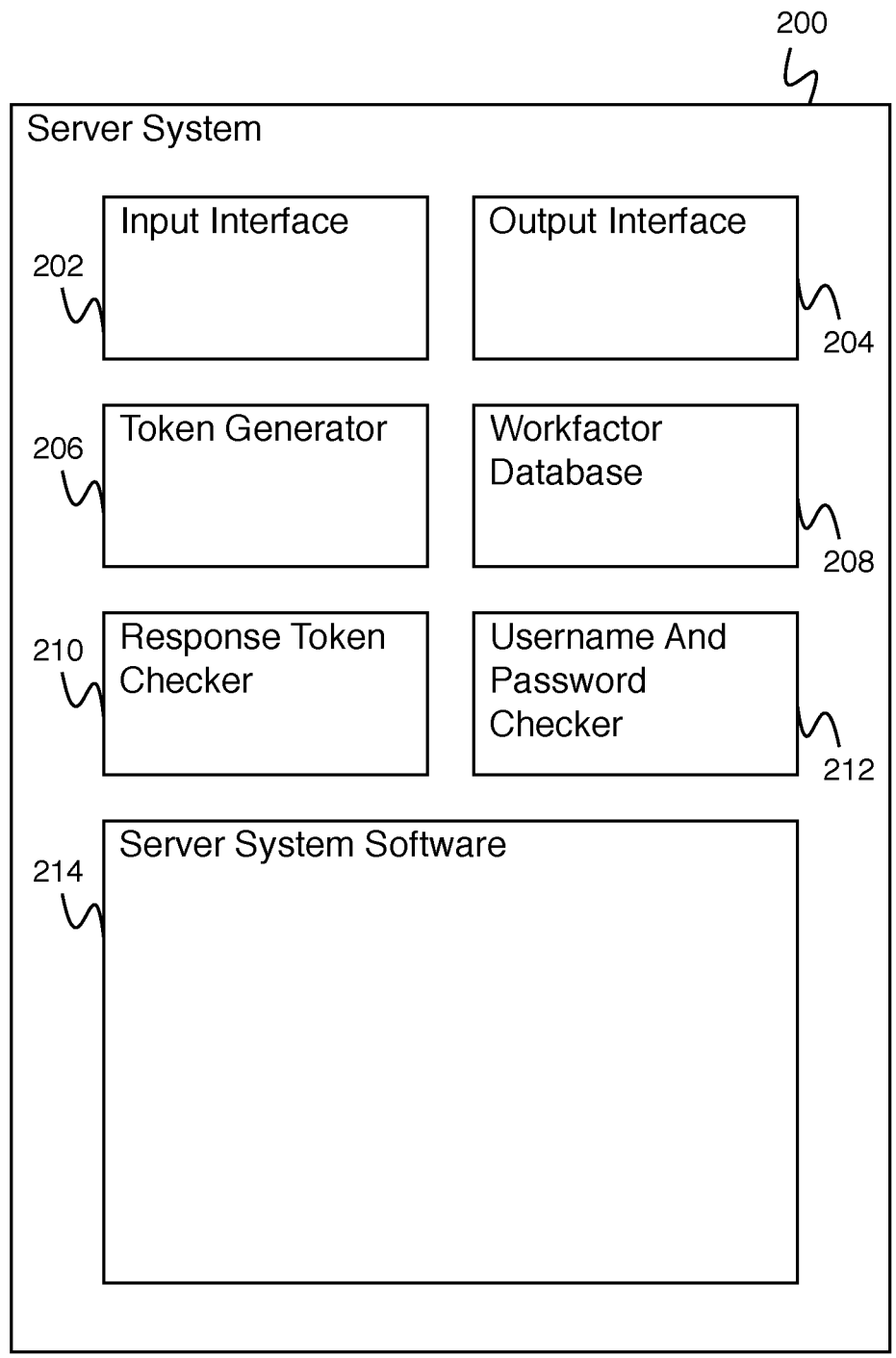
FIG. 2 is a block diagram illustrating an embodiment of a server system.

FIG. 2 is a block diagram illustrating an embodiment of a server system. In some embodiments, server system 200 comprises server system 102 of FIG. 1. In the example shown, server system 200 comprises input interface 202 (e.g., for receiving data from a network) and output interface 204 (e.g., for providing data to a network). In some embodiments, input interface 202 and output interface 204 comprise physical interfaces (e.g., an Ethernet interface, an optical data interface, a wireless interface, etc.). In some embodiments, input interface 202 is implemented using a processor. In some embodiments, output interface 204 is implemented using a processor. Server system 200 additionally comprises token generator 206. In some embodiments, token generator 206 comprises a token generator for generating a challenge token. In some embodiments, token generator 206 generates a challenge token to be presented to a client. In some embodiments, a challenge token comprises a random number. In various embodiments, a challenge token comprises a 16 bit number, a 32 bit number, a 64 bit number, or a number of any other appropriate length. In some embodiments, token generator 206 is implemented using a processor. Server system 200 additionally comprises workfactor database 208. In some embodiments, workfactor database 208 comprises a workfactor database for receiving, storing, and providing client information and determining a workfactor. In various embodiments, client information comprises a client associated tenant (e.g., the organization the client is associated with), a client associated username, a client associated Internet Protocol address, a client associated password, a client workfactor, a client challenge token, or any other appropriate client associated information. In some embodiments, a workfactor associated with a client in workfactor database 208 is increased in the event an incorrect password associated with the client is received. In some embodiments, workfactor database 208 determines a workfactor to be presented to a client (e.g., a low workfactor for no login attempts in a period of time—for example, a 1 if no failed login attempts within a half hour; an incremented workfactor for more than N login attempts in a period of time—for example, +1 increment to the current workfactor for more than 3 failed login attempts in a half hour). In some embodiments, workfactor database 208 is implemented using a processor. In some embodiments, token generator 206 and workfactor database 208 comprise a challenge determiner for determining a workfactor and a challenge token. Response token checker 210 comprises a response token checker for determining whether a response token satisfies a condition based at least in part on the workfactor. In some embodiments, response token checker 210 checks a response token by concatenating the response token with the challenge token, computing a hash, determining the number of leading zeros of the hash, and comparing the number with a threshold based at least in part on the workfactor. In some embodiments, response token checker 210 is implemented using a processor and/or a memory (e.g., to store instructions or data and configured to provide the processor with the instructions or data). Username and password checker 212 comprises a username and password checker for checking a username and password. In some embodiments, username and password checker 212 checks a username and password in the event response token checker 210 determines that a response token satisfies a condition. In some embodiments, username and password checker 212 does not check a username and password in the event response token checker 210 determines that a response token does not satisfy a condition. In the event username and password checker 212 determine that the username and password are correct, the client associated with the username and password is granted access. In some embodiments, the client is granted access to server system software 214. In some embodiments, username and password checker 212 is implemented using a processor and/or a memory (e.g., to store instructions or data and configured to provide the processor with the instructions or data). Server system software 214 comprises server system software for providing server system functionality. In various embodiments, server system software 214 comprises human resources system database server software, financial database server software, document management server software, applications server software, machine control server software, website server software, or any other appropriate server software. In some embodiments, server system software 214 is implemented using a processor and/or a memory (e.g., to store instructions or data and configured to provide the processor with the instructions or data). In some embodiments, the elements of server system 200 are each implemented using separate processors, are all implemented using a single processor, or are combined onto multiple processors in any other appropriate way.

Figure 3:
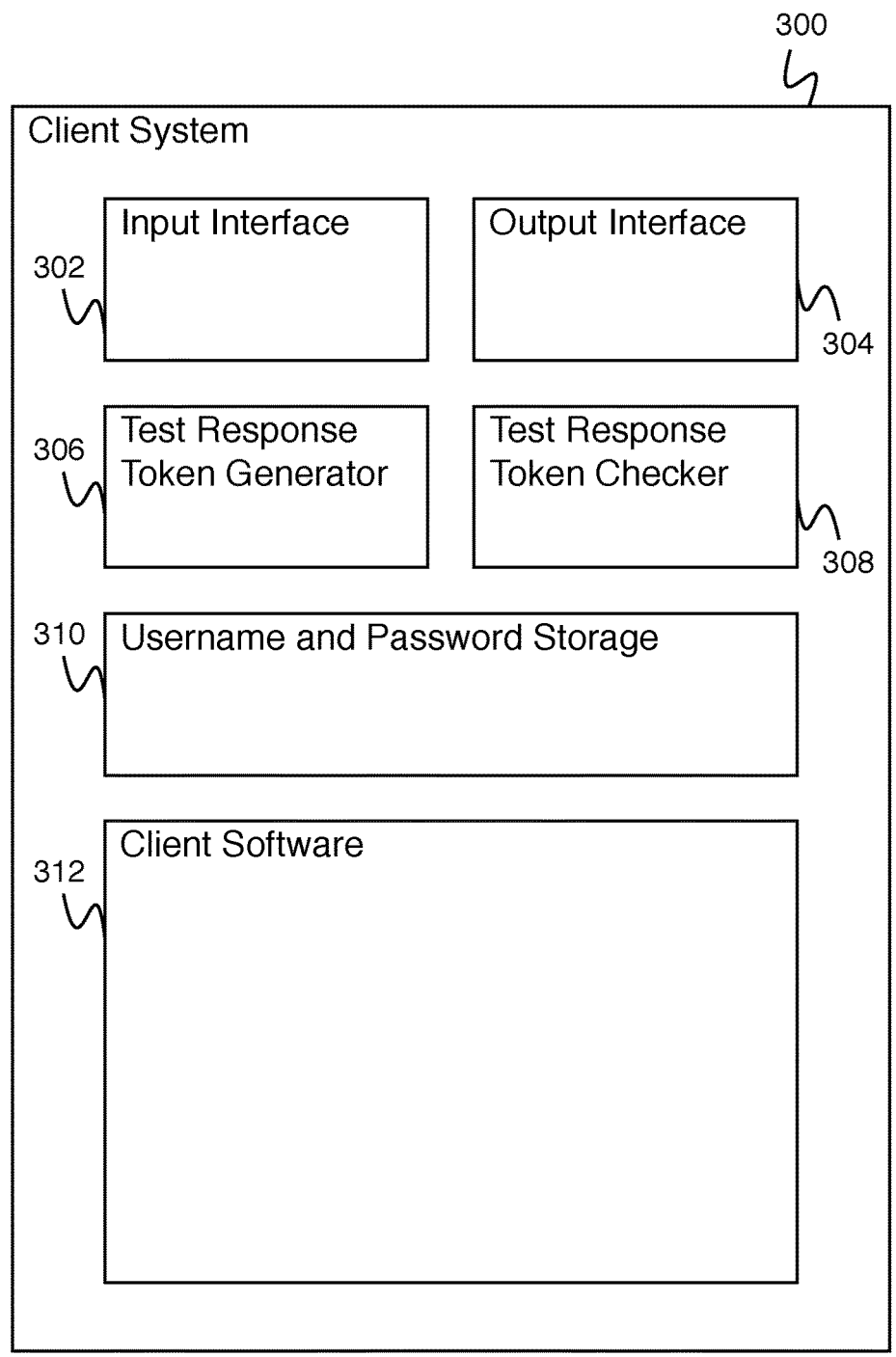
FIG. 3 is a block diagram illustrating an embodiment of a client system.

FIG. 3 is a block diagram illustrating an embodiment of a client system. In some embodiments, server system 300 comprises client system 104 of FIG. 1. In the example shown, client system 300 comprises input interface 302 (e.g., for receiving data from a network) and output interface 304 (e.g., for providing data to a network). In some embodiments, input interface 302 and output interface 304 comprise physical interfaces (e.g., an Ethernet interface, an optical data interface, a wireless interface, etc.). In some embodiments, client system 300 contacts server system 200 and requests a login page. In various embodiments, input interface 302 comprises an input interface for receiving a login page, a challenge token, a workfactor, or any other appropriate information. Client system 300 additionally comprises test response token generator 306. In some embodiments, test response token generator 306 comprises a token generator for determining a test response token (e.g., a number comprising a test response token). In various embodiments, test response token generator 306 comprises a test response token generator for generating a random number, for generating an incremental number (e.g., one greater than the previous number it generated), for generating a known starting number (e.g., a known starting point for test response tokens—for example, the number 0), or for generating any other test response token. In some embodiments, when client system 300 is presented with a new challenge token and workfactor, test response token generator 306 first generates a known starting number as a test response token, then generates incremental numbers as test response tokens until the correct response token is found. Test response token checker 308 comprises a test response token checker for checking whether a test response token (e.g., a test response token generated by test response token generator 306) is a correct response to a challenge token and a workfactor. In some embodiments, test response token checker 308 determines whether a test response token is a correct response to a challenge token and a workfactor by concatenating the test response token with the challenge token, computing a hash of the concatenated tokens, determining the number of leading zeros of the hash, and comparing the number of leading zeros with a threshold, wherein the threshold is based at least in part on the workfactor. In some embodiments, test response token generator 306 generates test response tokens until test response token checker verifies that a test response token is a correct test response token. In some embodiments, a correct test response token comprises a response token. In some embodiments, when client system 300 has found a response token, the response token is provided to a server system (e.g., via output interface 304) along with a username and password (e.g., a username and password stored in username and password storage 310). In some embodiments, in the event the response token is verified by the server system as correct and the username and password are verified as correct, the client system is granted access to the server system. In some embodiments, when client system 300 is granted access to the server system, a user using client system interacts with the server system via client software 312. In various embodiments, client system is implemented using one or more processors and/or one or more memories (e.g., to store instructions or data and configured to provide the processor(s) with the instructions or data). In various embodiments, the condition uses a number of trailing zeros, a division equal to a value, or any other appropriate condition that is scalable in difficulty for different workfactors.

Figure 4:
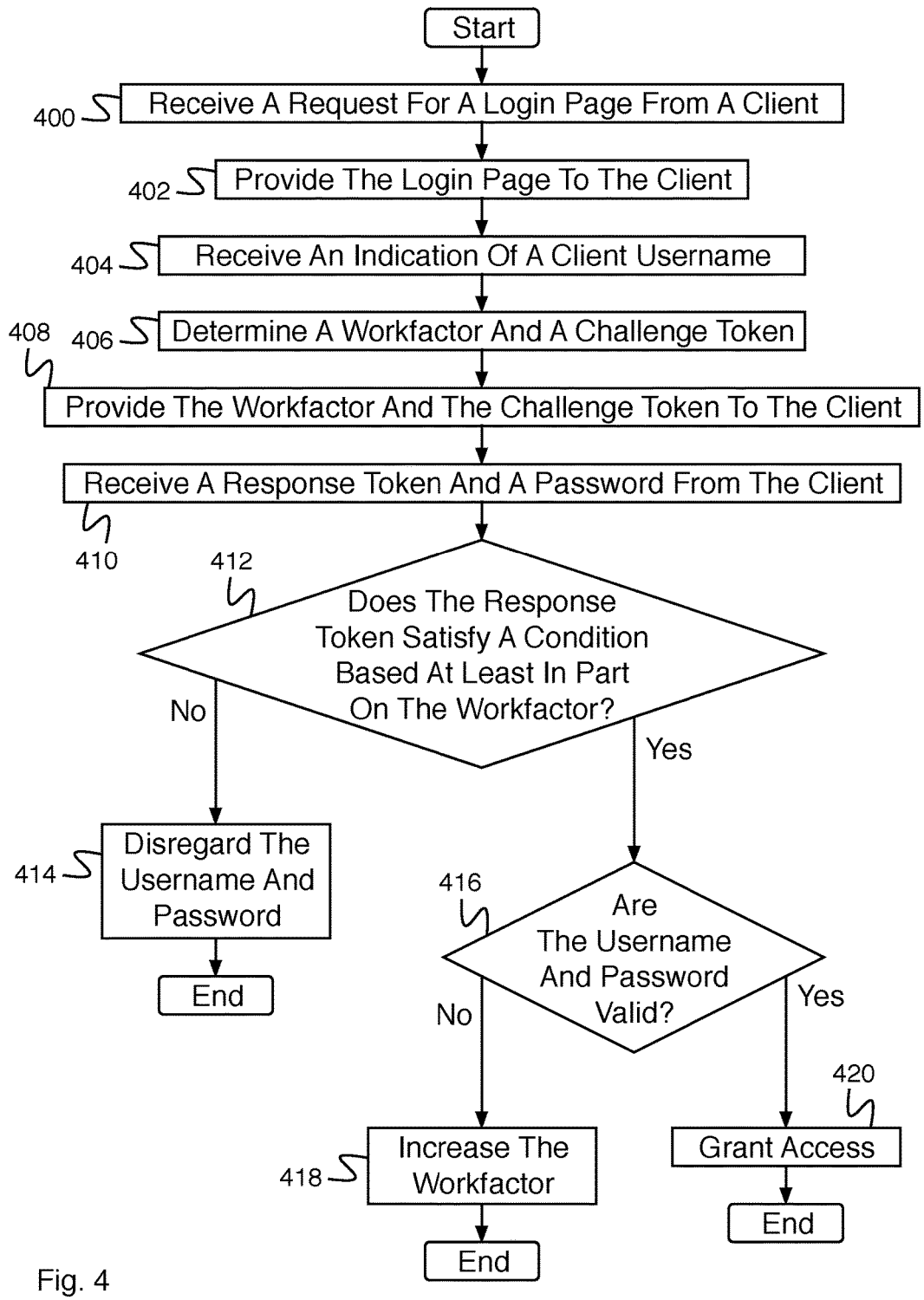
FIG. 4 is a flow diagram illustrating an embodiment of a process for a server system.

FIG. 4 is a flow diagram illustrating an embodiment of a process for a server system. In some embodiments, the process of FIG. 4 comprises a process for server system 200 of FIG. 2. In some embodiments, the process of FIG. 4 comprises a process for a system for preventing a brute force attack. In the example shown, in 400, a request for a login page is received from a client. In some embodiments, the client request for a login page is associated with a requesting tenant (e.g., a company or organization the client is associated with). In some embodiments, the client request for a login page is associated with a requesting Internet Protocol (e.g., IP) address (e.g., the Internet address the client is making the request from). In 402, the login page is provided to the client. In some embodiments, the login page comprises username and password entry fields (e.g., for a user to enter a username and password). In some embodiments, the login page is determined such that as soon as the client has entered a username into the username field, the username is provided to the server system. In 404, the server system receives an indication of a client username. In 406, a workfactor and a challenge token are determined. In some embodiments, a workfactor is determined based at least in part on the received client username. In some embodiments a workfactor is determined from a workfactor database. In some embodiments, a workfactor database stores a workfactor associated with a username. In some embodiments, a workfactor database stores a number of failed login attempts associated with a username, and a workfactor is determined based at least in part on a number of failed login attempts. In some embodiments, a challenge token comprises a random number. In various embodiments, a challenge token comprises a 16 bit random number, a 32 bit random number, a 64 bit random number, a 128 bit random number, or any other appropriate size random number. In 408, the system provides the workfactor and the challenge token to the client. In 410, the system receives a response token and a password from the client. In some embodiments, the response token comprises a response token responding to the workfactor and challenge token. In some embodiments, the password comprises a password associated with the username. In 412, the system determines whether the response token satisfies a condition based at least in part on the workfactor. In some embodiments, determining whether the response token satisfies a condition based at least in part on the workfactor comprises concatenating the response token with the challenge token, computing a hash, determining the number of leading zeros of the hash, and comparing the number with a threshold based at least in part on the workfactor. In the event it is determined that the response token satisfies a condition based at least in part on the workfactor, control passes to 416. In the event it is determined that the response token does not satisfy a condition based at least in part on the workfactor, control passes to 414. In 414, the username and password are disregarded. In some embodiments, an error message is provided to the client (e.g., indicating the response token does not satisfy the condition). The process then ends. In 416, it is determined whether the username and password are valid. In the event the username and password are determined to be valid, control passes to 420. In the event the username and password are determined not to be valid, control passes 418. In 418, the workfactor is increased. In some embodiments, the workfactor is increased in a workfactor database. In some embodiments, a number of failed login attempts is increased in a database. In some embodiments, an error message is provided to the client (e.g., indicating the username and password are not valid). The process then ends. In 420, access is granted. In some embodiments, granting access comprises granting the client system access to server system software. In some embodiments, an access granted message is provided to the client. In some embodiments, instructions for the steps of the process of FIG. 4 are stored in a memory and provided for execution by a processor coupled to the memory. In various embodiments, the memory comprises a magnetic memory, a solid-state memory, an optical memory, or any other appropriate memory.

Figure 5:
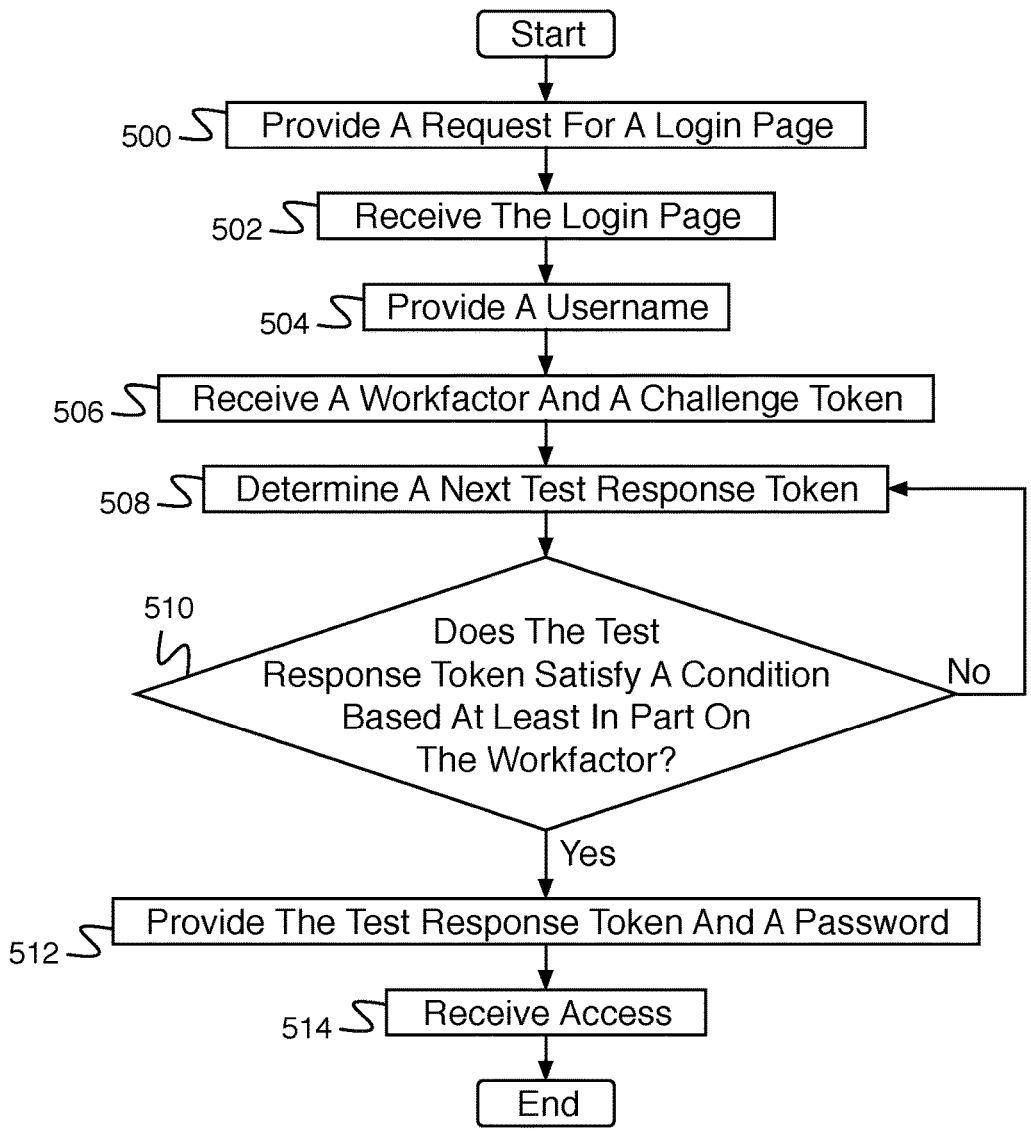
FIG. 5 is a flow diagram illustrating an embodiment of a process for a client system.

FIG. 5 is a flow diagram illustrating an embodiment of a process for a client system. In some embodiments, the process of FIG. 5 comprises a process for client system 300 of FIG. 3. In some embodiments, the process of FIG. 5 comprises a process for a client system interacting with a system for preventing a brute force attack. In the example shown, in 500, a request for a login page is provided. In 502, the login page is received. In 504, the client system provides a username. In 506, a workfactor and a challenge token are received. In 508, the client system determines a next test response token. In some embodiments, a next test response token comprises a first test response token. In various embodiments, a next test response token comprises a predetermined test response token value, a random test response token value, an incremented test response token value, or any other appropriate test response token value. In 510, the client system determines whether the test response token satisfies a condition based at least in part on the workfactor. In the event the test response token does not satisfy the condition, control passes to 508. In the event the test response token satisfies the condition, control passes to 512. In some embodiments, the condition is determined in such a way that the client system is only able to determine a response token that satisfies the condition by checking test response tokens until a test response token that satisfies the condition is found (e.g., there is no direct way to compute the response token from the challenge token). In 512, the test response token (e.g., the test response token found to satisfy the condition) and a password are provided. In 514, the client system receives access (e.g., to server system software). In some embodiments, in the event the password is incorrect, the client system does not receive access. In some embodiments, the client system receives an indication that the login attempt failed and needs to be retried. In some embodiments, the client system receives a retry login page, a retry challenge token, and a retry workfactor.

In some embodiments, from the point of view of a user interacting with a client system executing the process of FIG. 5, the extra interactions with the system for preventing a brute force attack (e.g., extra as compared with a conventional username and password login page) are transparent. The user requests a login page and receives a login page with username and password fields. When the user enters a username into the username field, it is automatically provided to the system for preventing a brute force attack, and a workfactor and challenge token are received in response. The client system then automatically begins computing the response token. The user at the same time enters the password into the password field. Once a satisfactory response token has been determined and the password has been entered, they are both then provided to the system for preventing a brute force attack. The system for preventing a brute force attack first checks the response token, then checks the username and password. In the event it determines that everything is satisfactory, access to the server system software is granted to the client system, and the user accesses the server as desired. In the event that the login attempt fails, the client system is burdened with greater and greater work to find response tokens to attempt to access the system. This greater work burdens the systems by requiring calculations in order to try accessing the system.

Figure 6:
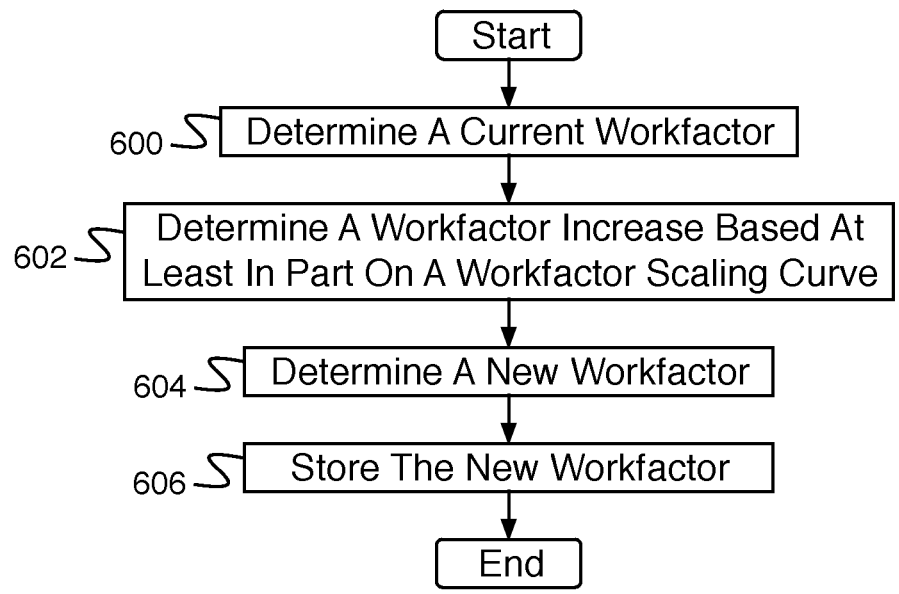
FIG. 6 is a flow diagram illustrating an embodiment of a process for increasing a workfactor.

FIG. 6 is a flow diagram illustrating an embodiment of a process for increasing a workfactor. In some embodiments, the process of FIG. 6 implements 418 of FIG. 4. In the example shown, in 600, a current workfactor is determined. In some embodiments, a current workfactor is determined from a workfactor database. In 602, a workfactor increase is determined based at least in part on a workfactor scaling curve. In some embodiments, the workfactor scaling curve is linear (e.g., the workfactor increase does not depend on the current workfactor value), the workfactor scaling curve is super-linear (e.g., the workfactor increase increases as the workfactor increases), the workfactor scaling curve is sub-linear (e.g., the workfactor increase decreases as the workfactor increases), or the workfactor scaling curve is non-linear in any other appropriate way (e.g., comprises both super-linear and sub-linear regions, etc.). In 604, a new workfactor is determined (e.g., by adding the workfactor increase to the current workfactor). In 606, the new workfactor is stored.

Figure 7:
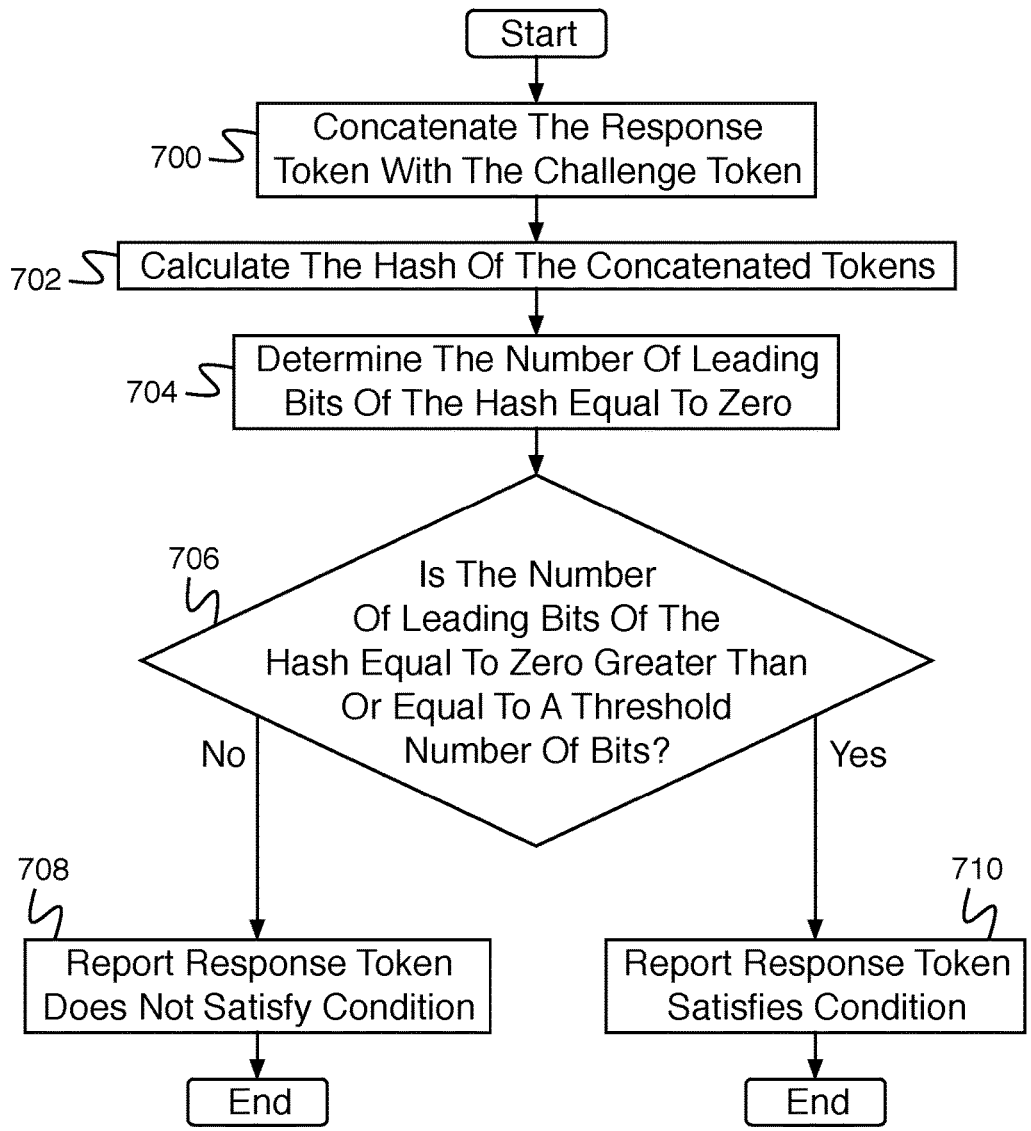
FIG. 7 is a flow diagram illustrating an embodiment of a process for determining whether a response token satisfies a condition based at least in part on a workfactor.

FIG. 7 is a flow diagram illustrating an embodiment of a process for determining whether a response token satisfies a condition based at least in part on a workfactor. In some embodiments, the process of FIG. 7 implements 412 of FIG. 4. In some embodiments, the process of FIG. 7 implements 510 of FIG. 5. In the example shown, in 700, the response token is concatenated with the challenge token. In some embodiments, concatenating the response token with the challenge token comprises joining the strings of bits of the two tokens end to end to form a single string of bits. For example, response token for leading bits and challenge token for following bits, or challenge token for leading bits and response token for following bits. In 702, the hash of the concatenated tokens is calculated. In various embodiments, the hash comprises a SHA-1 hash, a SHA-256 hash, or any other appropriate hash. In 704, the number of leading bits of the hash equal to zero is determined. In 706, it is determined whether the number of leading bits of the hash equal to zero is greater than or equal to a threshold number of bits. In some embodiments, the threshold number of bits comprises the workfactor. In some embodiments, the threshold number of bits is based at least in part on the workfactor (e.g., the threshold number of bits comprises a multiple of the workfactor, the threshold number of bits is determined by looking up the workfactor in a threshold table, etc.). In the event it is determined that the number of leading bits of the hash equal to zero is greater than or equal to the threshold number of bits, control passes to 710. In the event it is determined that the number of leading bits of the hash equal to zero is not greater than or equal to the threshold number of bits, control passes to 708. In 708, the process reports that the response token does not satisfy the condition. The process then ends. In 710, the process reports that the response token satisfies the condition. In various embodiments, the condition is based on one of the following: a number of trailing bits equal to zero, a division of the hash being equal to a number, or any other appropriate condition.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for preventing a brute force attack, comprising:
    an output interface to:
        provide a workfactor, a challenge token, and a login page to a client;
    an input interface to:
        receive a response token, a username, and a password;
    a processor to:
        determine whether the response token satisfies a condition based at least in part on the workfactor, wherein the determining of whether the response token satisfies the condition comprises to:
        concatenate the response token and the challenge token to obtain a concatenated token;
        compare a number of leading zeros of a hash of the concatenated token with a first threshold number of bits, wherein the condition relates to the number of leading zeros of the hash of the concatenated token being greater than or equal to the first threshold number of bits; and
        in response to a determination that the number of leading zeros of the hash of the concatenated token is greater than or equal to the first threshold number of bits, determine that the response token satisfies the condition; and
    in response to a determination that the response token satisfies the condition based at least in part on the workfactor, determine whether the username and password are valid, wherein the workfactor is increased in response to a determination that the username and password are determined not to be valid.

2. The system of claim 1, wherein the processor is further to determine the workfactor and the challenge token.

3. The system of claim 1, wherein the hash comprises a SHA-256 hash.

4. The system of claim 1, wherein the first threshold number of bits is determined based at least in part on the workfactor.

5. The system of claim 1, wherein the condition comprises having a number of trailing bits equal to zero of the hash of the concatenated token being greater than or equal to a second threshold number of bits.

6. The system of claim 1, wherein the condition comprises the hash of the concatenated token being divisible by an integer.

7. The system of claim 1, wherein the response token is determined by calculating prime factors of the challenge token.

8. The system of claim 1, wherein the input interface is further to receive a request for a login page from a client.

9. The system of claim 1, wherein the workfactor is associated with a client.

10. The system of claim 9, wherein the client is associated with a tenant, the username, and an IP address.

11. The system of claim 1, wherein the processor is further to grant access in response to a determination that the username and the password are determined to be valid.

12. The system of claim 1, wherein the username and the password are determined to be valid in response to a determination that the response token does not satisfy the condition based at least in part on the workfactor.

13. A method for preventing a brute force attack, comprising:
    provide a workfactor, a challenge token, and a login page to a client;
    receive a response token, a username, and a password;
    determine, using a processor, whether the response token satisfies a condition based at least in part on the workfactor, wherein the determining of whether the response token satisfies the condition comprises to:
        concatenate the response token and the challenge token to obtain a concatenated token;
        compare a number of leading zeros of a hash of the concatenated token with a first threshold number of bits, wherein the condition relates to the number of leading zeros of the hash of the concatenated token being greater than or equal to the first threshold number of bits; and
        in response to a determination that the number of leading zeros of the hash of the concatenated token is greater than or equal to the first threshold number of bits, determine that the response token satisfies the condition; and
    in response to a determination that the response token satisfies the condition based at least in part on the workfactor, determine whether the username and password are valid, wherein the workfactor is increased in response to a determination that the username and password are determined not to be valid.

14. A computer program product for preventing a brute force attack, the computer program product being embodied in a non-transitory computer readable storage medium and comprising computer instructions for:
    provide a workfactor, a challenge token, and a login page to a client;
    receive a response token, a username, and a password;
    determine, using a processor, whether the response token satisfies a condition based at least in part on the workfactor, wherein the determining of whether the response token satisfies the condition comprises to:

concatenate the response token and the challenge token to obtain a concatenated token;

compare a number of leading zeros of a hash of the concatenated token with a first threshold number of bits, wherein the condition relates to the number of leading zeros of the hash of the concatenated token being greater than or equal to the first threshold number of bits; and in response to a determination that the number of leading zeros of the hash of the concatenated token is greater than or equal to the first threshold number of bits, determine that the response token satisfies the condition; and in response to a determination that the response token satisfies the condition based at least in part on the workfactor, determine whether the username and password are valid, wherein the workfactor is increased in response to a determination that the username and password are determined not to be valid.

* * * * *